(12) United States Patent
Zhou et al.

(10) Patent No.: US 10,594,208 B2
(45) Date of Patent: Mar. 17, 2020

(54) CURRENT LIMITING CONTROL METHOD AND DEVICE FOR THREE-LEVEL INVERTER

(71) Applicant: Vertiv Tech Co., Ltd., Shenzhen, Guangdong (CN)

(72) Inventors: Yuan Zhou, Guangdon (CN); Huawei Hu, Guangdong (CN); Xiangbiao Peng, Guangdong (CN)

(73) Assignee: Vertiv Tech Co., Ltd., Shenzhen (CN)

( * ) Notice: Subject to any disclaimer, the term of this patent is extended or adjusted under 35 U.S.C. 154(b) by 0 days.

(21) Appl. No.: 15/980,043

(22) Filed: May 15, 2018

(65) Prior Publication Data

US 2019/0173373 A1   Jun. 6, 2019

(30) Foreign Application Priority Data

Dec. 1, 2017   (CN) .......................... 2017 1 1248722

(51) Int. Cl.
*H02M 1/32*   (2007.01)
*H02M 7/487*   (2007.01)
(Continued)

(52) U.S. Cl.
CPC .............. *H02M 1/32* (2013.01); *H02M 1/36* (2013.01); *H02M 7/487* (2013.01); *H02M 7/53871* (2013.01)

(58) Field of Classification Search
CPC ...... H02M 1/32; H02M 7/53871; H02H 1/04; H02H 3/08; H02H 3/105; H02H 9/00
(Continued)

(56) References Cited

U.S. PATENT DOCUMENTS 9,531,185 B2   12/2016   Liu et al.
2013/0223114 A1*   8/2013   Nakayama .............. H02M 1/32
                                                                 363/55
(Continued)

FOREIGN PATENT DOCUMENTS

CN   102624273 A   8/2012
CN   102684532 A   9/2012
(Continued)

OTHER PUBLICATIONS

European Search Report regarding European Application No. 18174276.8 dated Jan. 7, 2019.
(Continued)

*Primary Examiner* — Jeffrey A Gblende
*Assistant Examiner* — Bart Iliya
(74) *Attorney, Agent, or Firm* — Harness, Dickey & Pierce, P.L.C.

(57) ABSTRACT

A current limiting control method for a three-level inverter, comprising the following steps: S1. when a current output from a bridge arm is greater than or equal to a current limiting threshold and a received overcurrent signal is enabled, first turning off the main switch transistors and then turning off the auxiliary switch transistors; S2. when the current output from the bridge arm drops to lower than the current limiting threshold and the received overcurrent signal is disabled, turning on the auxiliary switch transistors; S3. when the received overcurrent signal is disabled and a next PWM effective edge of the main switch transistors arrives, turning on the main switch transistors. The present invention relates also to a current limiting control device for a three-level inverter. By implementing the present invention, it is possible to ensure voltage waveform quality and reduce switching loss.

6 Claims, 6 Drawing Sheets

(51) Int. Cl.
*H02M 1/36* (2007.01)
*H02M 7/5387* (2007.01)

(58) Field of Classification Search
USPC .......................................................... 700/293
See application file for complete search history.

(56) References Cited

U.S. PATENT DOCUMENTS

| | | | | |
|---|---|---|---|---|
| 2014/0003103 A1* | 1/2014 | Aaltio | ...................... | H02M 1/32 |
| | | | | 363/56.03 |
| 2014/0204636 A1* | 7/2014 | Liu | ........................ | H02H 7/122 |
| | | | | 363/55 |
| 2016/0218557 A1* | 7/2016 | Cinti | ........................ | H02M 1/32 |
| 2017/0133925 A1* | 5/2017 | Liu | ........................ | H02H 7/122 |

FOREIGN PATENT DOCUMENTS

| | | |
|---|---|---|
| CN | 102868291 A | 1/2013 |
| CN | 104767368 A | 7/2015 |
| CN | 104270026 B | 3/2017 |
| CN | 104518697 B | 5/2017 |
| EP | 2750272 A1 | 7/2014 |

OTHER PUBLICATIONS

First Chinese Office Action regarding Application No. 201711248722.9 dated Sep. 30, 2019.

* cited by examiner

CURRENT LIMITING CONTROL METHOD AND DEVICE FOR THREE-LEVEL INVERTER

The present application claims the priority to Chinese Patent Application No. 201711248722.9, titled "CURRENT LIMITING CONTROL METHOD AND DEVICE FOR THREE-LEVEL INVERTER", filed on Dec. 1, 2017 with the Chinese State Intellectual Property Office, which is incorporated herein by reference in its entirety.

TECHNICAL FIELD

The present invention relates to a field of uninterruptible power supplies, and more particularly to a current limiting control method and device for a three-level inverter.

BACKGROUND ART

Figure 1:
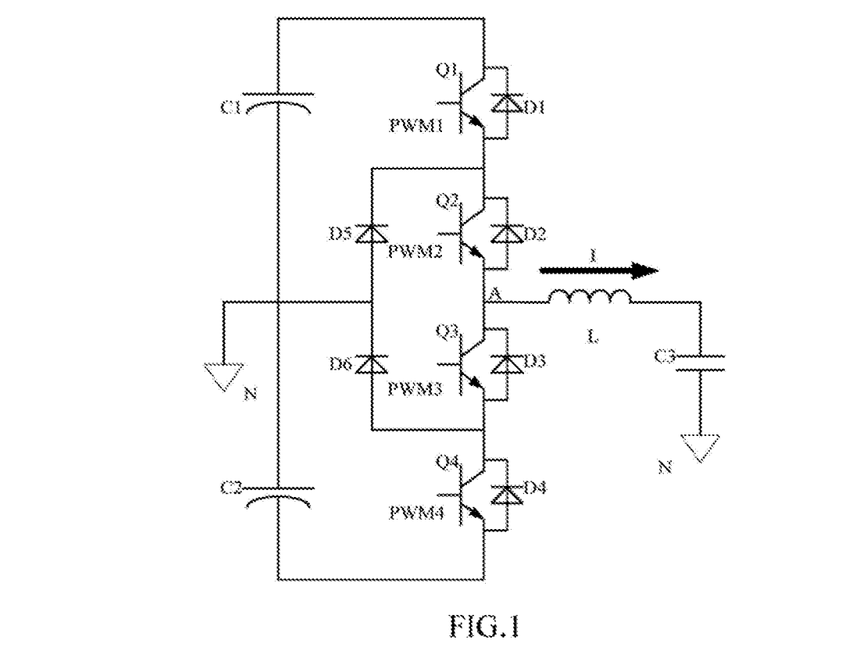
FIG. 1 is a bridge arm output circuit diagram of an I-type three-level inverter.

A current limiting technique is a very important protection technique of an inverter, which can effectively protect power switch elements when the inverter suddenly is heavily loaded or has a short-circuited output, so as to improve the impact resistance of the inverter. FIG. 1 shows a bridge arm output circuit diagram of a typical I-type three-level inverter. As shown in FIG. 1, the I-type three-level inverter comprises four switch transistors, i.e., a main switch transistor Q1 and an auxiliary switch transistor Q2 which are located at an upper bridge arm, and a main switch transistor Q4 and an auxiliary switch transistor Q3 which are located at a lower bridge arm.

At the time of a current limiting blockage, first, the main switch transistors Q1 and Q4 shall be turned off, and then the auxiliary switch transistors Q2 and Q3 shall be blocked after the main switch transistors Q1 and Q4 are reliably blocked. When an inductive current I drops to below a current protection threshold, a current limiting signal disappears, and after the current limiting signal disappears, an appropriate timing is selected to start de-blocking logic; that is, first, the two auxiliary switch transistors Q2 and Q3 are compulsorily turned on for a period of time, and after the auxiliary switch transistors Q2 and Q3 are reliably turned on such that a midpoint level is established, an auxiliary switch transistor (e.g. Q3) which is unnecessarily normally turned on is then turned off for a period of time and thereafter Q2 and Q3 are controlled to act according to normal switching logic, then the main switch transistors Q1 and Q4 are turned on, and the main switch transistors Q1 and Q4 are controlled to act according to normal switching logic, thereby ending the current limiting process and entering normal wave generation logic. The appropriate timing indicated herein refers to: when the current limiting signal disappears, whether the de-blocking logic is started immediately or the de-blocking logic is not started until an effective edge of PWM arrives. Generally speaking, wave-by-wave current limiting refers to that after the current limiting signal disappears, the de-blocking logic is not started until an effective edge of PWM arrives. For MOSFETs or IGBTs with an enough switching speed, it is also possible to enter the de-blocking logic once it is confirmed that the current limiting signal disappears, without waiting for an effective edge of PWM, and this current limiting manner is referred to as non-wave-by-wave current limiting manner.

However, in the existing current limiting techniques, the wave-by-wave current limiting manner has defects in regard to poor output voltage waveforms and in regard to mutual irrigation of energy between positive and negative buses; and although the non-wave-by-wave current limiting manner has better output voltage waveforms, it possibly involves more severe mutual irrigation of energy between positive and negative buses, resulting in a big risk of occurrence of an overvoltage to a unilateral bus, thus increasing a risk of damaging switch transistors.

To remove the defects in the aforementioned technical solutions, there is proposed an improved solution: the wave-by-wave current limiting manner is adopted for the main switch transistors, and the non-wave-by-wave current limiting manner allowing multiple times of turn-ons within one PWM cycle is adopted for the auxiliary switch transistors, so as to turn on the auxiliary switch transistors once the current limiting signal disappears, letting a bridge arm output voltage be at an N-line level. However, this solution still has the following significant disadvantage: after occurrence of the wave-by-wave current limiting, switching of the auxiliary switch transistors is possibly performed multiple times within one switching cycle, which is equivalent to that a switching frequency of the auxiliary switch transistors is n-times multiplied, which will greatly increase switching loss of diodes of the auxiliary switch transistors and the main switch transistors.

SUMMARY OF THE INVENTION

The technical problem to be solved by the present invention lies in: providing, with respect to the above defects of the prior art, a current limiting control method and device for a three-level inverter which not only can ensure voltage waveform quality after occurrence of current limiting but also can ensure a switching frequency of switch transistors not to excessively increase.

The technical solution adopted by the present invention to solve its technical problem is: constructing a current limiting control method for a three-level inverter, wherein the three-level inverter at least comprises a bridge arm including main switch transistors and auxiliary switch transistors, the method comprising the following steps:

S1. when a current output from the bridge arm is greater than or equal to a current limiting threshold and a received overcurrent signal is enabled, first turning off the main switch transistors and then turning off the auxiliary switch transistors;

S2. when the current output from the bridge arm drops to lower than the current limiting threshold and the received overcurrent signal is disabled, turning on the auxiliary switch transistors;

S3. when the received overcurrent signal is disabled and a next PWM effective edge of the main switch transistors arrives, turning on the main switch transistors.

In the current limiting control method for the three-level inverter according to the present invention, the step S2 further comprises:

S21. when the current output from the bridge arm drops to lower than the current limiting threshold and the received overcurrent signal is disabled, turning on the auxiliary switch transistors after elapse of a first delay time;

S22. when the current output from the bridge arm rises to greater than or equal to the current limiting threshold and the received overcurrent signal is enabled, again turning off the auxiliary switch transistors and no longer turning on the auxiliary switch transistors within this switching cycle.

The current limiting control method for the three-level inverter according to the present invention further comprises:

S4. switching, based on the number of switching cycles during each of which current limit switching of the auxiliary switch transistors has occurred twice, a switching frequency of the auxiliary switch transistors within each switching cycle.

In the current limiting control method for the three-level inverter according to the present invention, the step S4 further comprises:

S41. when among the set number of switching cycles the number of switching cycles during each of which current limit switching of the auxiliary switch transistors has occurred twice is equal to or greater than a switching threshold, limiting that current limit switching can be performed only once for the auxiliary switch transistors in consecutive cycles;

S42. when among the set number of switching cycles the number of switching cycles during each of which current limit switching of the auxiliary switch transistors has occurred once is equal to or greater than a switching threshold, allowing that current limit switching is performed twice for the auxiliary switch transistors in consecutive cycles.

In the current limiting control method for the three-level inverter according to the present invention, the three-level inverter comprises an I-type three-level inverter and a T-type three-level inverter.

Another technical solution adopted by the present invention to solve its technical problem is: constructing a current limiting control device for a three-level inverter, wherein the three-level inverter at least comprises a bridge arm including main switch transistors and auxiliary switch transistors, the current limiting control device comprising:

a current limiting control module for, when a current output from the bridge arm is greater than or equal to a current limiting threshold and a received overcurrent signal is enabled, first turning off the main switch transistors and then turning off the auxiliary switch transistors;

an auxiliary switch transistor turn-on module for, when the current output from the bridge arm drops to lower than the current limiting threshold and the received overcurrent signal is disabled, turning on the auxiliary switch transistors;

a main switch transistor turn-on module for, when the received overcurrent signal is disabled and a next PWM effective edge of the main switch transistors arrives, turning on the main switch transistors.

In the current limiting control device for the three-level inverter according to the present invention, the auxiliary switch transistor turn-on module further comprises:

a turn-on unit for, when the current output from the bridge arm drops to lower than the current limiting threshold and the received overcurrent signal is disabled, turning on the auxiliary switch transistors after elapse of a first delay time;

a turn-off unit for, when the current output from the bridge arms rises to greater than or equal to the current limiting threshold and the received overcurrent signal is enabled, again turning off the auxiliary switch transistors and no longer turning on the auxiliary switch transistors within this switching cycle.

The current limiting control device for the three-level inverter according to the present invention further comprises:

a switching-frequency switching module for switching, based on the number of switching cycles during each of which current limit switching of the auxiliary switch transistors has occurred twice, a switching frequency of the auxiliary switch transistors within each switching cycle.

In the current limiting control device for the three-level inverter according to the present invention, the switching-frequency switching module further comprises:

a switching limitation unit for, when among the set number of switching cycles the number of switching cycles during each of which current limit switching of the auxiliary switch transistors has occurred twice is equal to or greater than a switching threshold, limiting that current limit switching can be performed only once for the auxiliary switch transistors in consecutive cycles;

a switching transition unit for, when among the set number of switching cycles the number of switching cycles during each of which current limit switching of the auxiliary switch transistors has occurred once is equal to or greater than a switching threshold, allowing that current limit switching is performed twice for the auxiliary switch transistors in consecutive cycles.

In the current limiting control device for the three-level inverter according to the present invention, the three-level inverter comprises an I-type three-level inverter and a T-type three-level inverter.

By implementing the current limiting control method and device for the three-level inverter according to the present invention, when the current output from the bridge arm drops to lower than the current limiting threshold, the auxiliary switch transistors are directly turned on, making it possible to ensure voltage waveform quality, and when a next PWM effective edge of the main switch transistors arrives, the main switch transistors are turned on, making it possible to ensure that a switching frequency of the switch transistors will not excessively increase, so as to reduce switching loss. Further, by limiting a switching frequency of the auxiliary switch transistors within each switching cycle and controlling the number of times of two-time current limit switching of the auxiliary switch transistors within a plurality of cycles, it is made possible to more efficiently control the switching frequency of the auxiliary switch transistors, so as to further reduce switching loss.

BRIEF DESCRIPTION OF THE DRAWINGS

Hereinafter, the present invention will be further described in combination with drawings and embodiments. In the drawings.

DETAILED DESCRIPTION OF THE EMBODIMENTS

To make the object, the technical solution and the advantage of the present invention more clear and explicit, the present invention will be further described in detail in combination with drawings and embodiments below. It should be understood that the specific embodiments described herein are used only to construe the present invention, but not to limit the present invention. The further explanations and descriptions of the present invention which are made below in combination with the drawings and the embodiments take the case of having a resistive load as an example.

Figure 2:
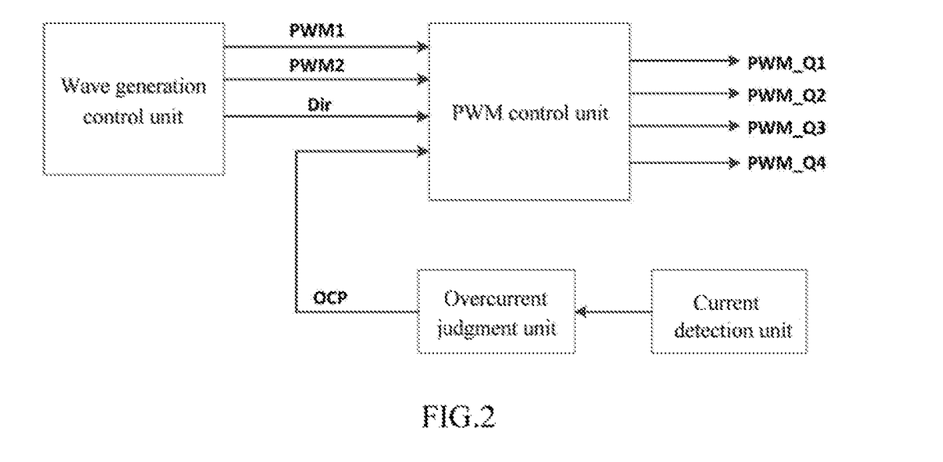
FIG. 2 is a structural schematic diagram of a current limiting control system of an existing three-level inverter.

Referring to FIG. 1, a three-level inverter at least comprises a bridge arm including four switch transistors sequentially connected in series, wherein the four switch transistors are a main switch transistor Q1 and an auxiliary switch transistor Q2 which are located at an upper bridge arm, and a main switch transistor Q4 and an auxiliary switch transistor Q3 which are located at a lower bridge arm, respectively. Referring to FIG. 2, in a current limiting control system of the three-level inverter, a wave generation control unit is used for outputting a direction signal (Dir) indicating that a current voltage is in a positive half cycle or a negative half cycle, and two branches of complementary PWM signals with dead zones, i.e., a PWM signal PWM1 of the main switch transistors and a PWM signal PWM2 of the auxiliary switch transistors, to a PWM control unit. The PWM control unit generates. according to the direction signal Dir and the two branches of complementary PWM signals with dead zones, four branches of PWM signals PWM_Q1, PWM_Q2, PWM_Q3 and PWM_Q4 which change according to predetermined logic, and respectively outputs the four branches of PWM signals to the four switch transistors Q1, Q2, Q3, Q4 in one phase of the three-level inverter, so as to drive the four switch transistors to act according to switching logic. A current detection unit is used for detecting an inductive current I, namely a current output from the bridge arm, i.e., a current flowing through the switch transistors, and converting the current I flowing through the switch transistors to a voltage and thereafter outputting it to an overcurrent judgment unit. The overcurrent judgment unit compares the received voltage value with a current-limiting voltage threshold (corresponding to a current-limiting current threshold), wherein if the received voltage value is greater than or equal to the current-limiting voltage threshold, an overcurrent signal output from the PWM control unit is enabled (the overcurrent signal output from the PWM control unit is changed from a low level to a high level), and if the received voltage value is less than the current-limiting voltage threshold, the overcurrent signal output from the PWM control unit is disabled (a low level is output). The PWM control unit judges, according to whether the received overcurrent signal is enabled, whether to perform current limiting control.

Figure 3:
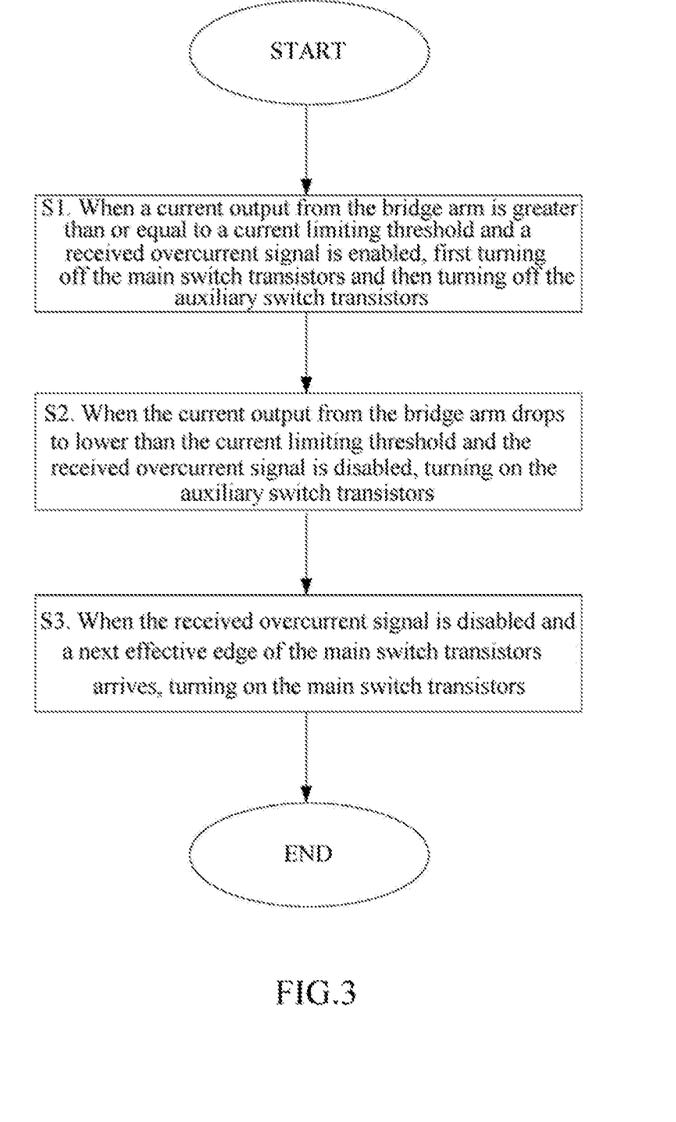
FIG. 3 is a flowchart of a first embodiment of a current limiting control method for a three-level inverter according to the present invention.

FIG. 3 is a flowchart of a first embodiment of a current limiting control method for a three-level inverter according to the present invention. The current limiting control method for the three-level inverter as shown in FIG. 3 is applicable to various types of three-level inverters, such as I-type three-level inverters and T-type three-level inverters, a single-phase or multi-phase three-level inverters. The three-level inverter at least comprises a bridge arm including main switch transistors and auxiliary switch transistors. As shown in FIG. 3, the current limiting control method for a three-level inverter according to the present invention comprises the following steps. At step S1, when a current output from the bridge arm is greater than or equal to a current limiting threshold and a received overcurrent signal is enabled, first turning off the main switch transistors and then turning off the auxiliary switch transistors; step S2 of, when the current output from the bridge arm drops to lower than the current limiting threshold and the received overcurrent signal is disabled, turning on the auxiliary switch transistors. At step S3, when the received overcurrent signal is disabled and a next PWM effective edge of the main switch transistors arrives, turning on the main switch transistors.

Figure 6:
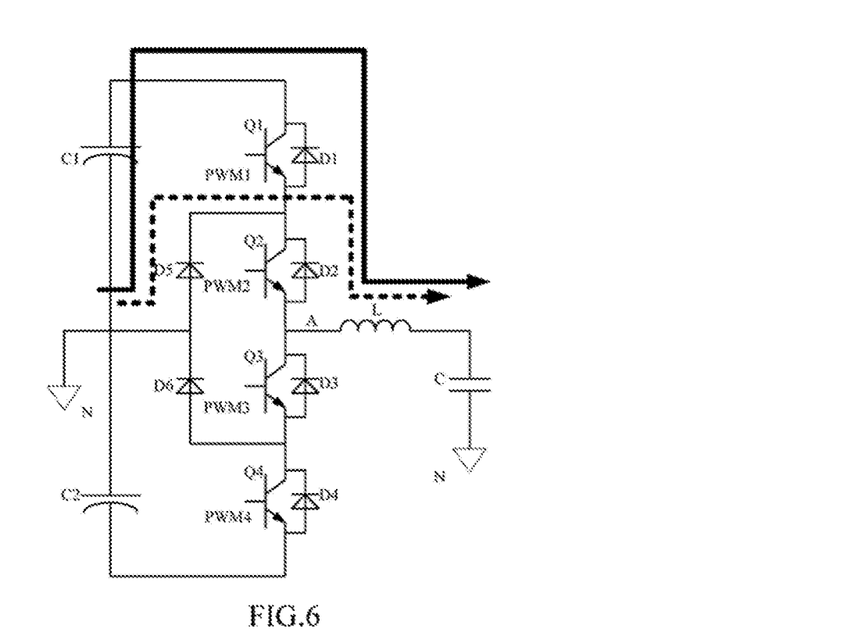
FIG. 6 is a normal current channel when the bridge arm output circuit in FIG. 1 operates with a resistive load in a positive half cycle of an output voltage.
Figure 7:
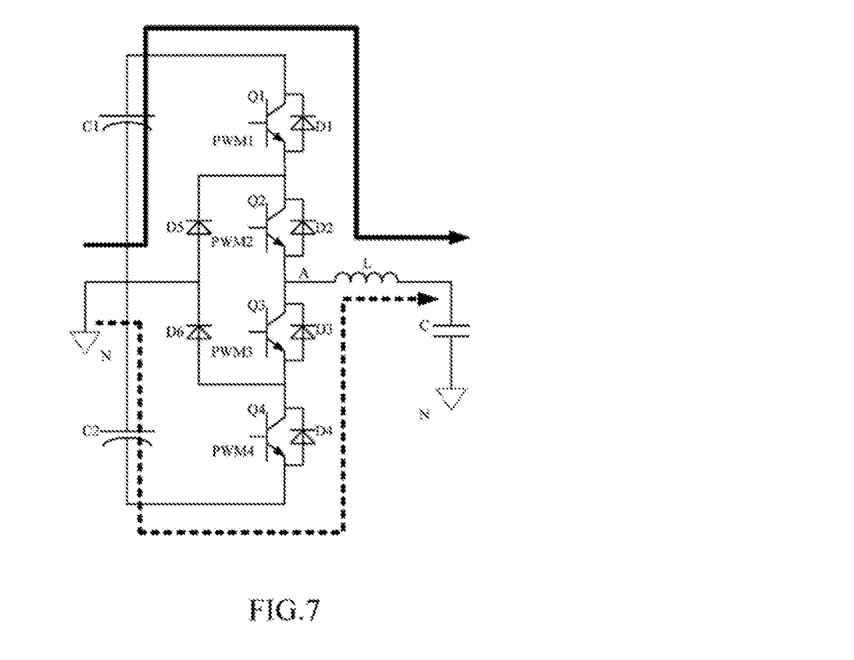
FIG. 7 is a current channel when the bridge arm output circuit in FIG. 1 is under current limiting control.

FIG. 1 is a bridge arm output circuit diagram of an I-type three-level inverter. FIG. 6 is a normal current channel when the bridge arm output circuit in FIG. 1 operates with a resistive load in a positive half cycle of an output voltage. FIG. 7 is a current channel when the bridge arm output circuit in FIG. 1 is under current limiting control. Hereinafter, the principle of the first embodiment of the current limiting control method for the three-level inverter as shown in FIG. 3 will be described as follows in combination with FIGS. 1 and 6-7.

If the current circuit operates in the positive half cycle of the output voltage, the four switch transistors Q1-Q4 are in the following operating states: the auxiliary switch transistor Q2 is normally on, the main switch transistor Q4 is normally off, and the main switch transistor Q1 and the auxiliary switch transistor Q3 are complementarily turned on. It is further assumed that the current is in a direction of flowing from a bus to a load, and it is defined that the flow direction of the current is positive, that is, as shown in FIG. 1, the flow direction of the inductive current I is positive.

When the main switch transistor Q1 is turned on and the auxiliary switch transistor Q3 is turned off, the inductive current I rises, an inductor L stores energy, at this time the voltage of the bridge arm output point A is a positive bus output voltage, and at this time the current loop is as shown by the real line in FIG. 6. When the main switch transistor Q1 is turned off and the auxiliary switch transistor Q3 is turned on, the inductive current I freewheels via the auxiliary switch transistor Q2, the voltage of the bridge arm output point A is at an N-point level, i.e., 0, and at this time the current loop is as shown by the dashed line in FIG. 6

If the inductive current I exceeds the set current limiting protection threshold, then current limiting logic is entered, the main switch transistor Q1 and the main switch transistor Q4 will be first turned off, and then the auxiliary switch transistor Q2 and the auxiliary switch transistor Q3 will be turned off after the main switch transistor Q1 is reliably turned off. After the auxiliary switch transistor Q2 and the auxiliary switch transistor Q3 are also completely turned off, the inductive current I will freewheels via a negative bus and freewheeling diodes D4, D3, the negative bus is charged, and the voltage of the bridge arm output point A is a negative bus output voltage. At this time the current loop is as shown in FIG. 7.

When all the four switch transistors Q1-Q4 are off the inductive current I is surely dropping. After the inductive current I drops to below the current limiting threshold, the auxiliary switch transistors Q2 and Q3 are turned on first, and then the main switch transistors Q1 and Q4 are turned on, thus exiting the current limiting logic.

After the inductive current I is lower than the current limiting protection threshold, entry into de-blocking logic may be considered. For wave-by-wave current limiting, it is necessary to wait for a PWM effective edge. If the PWM effective edge does not arrive, blocking of the four switch transistors continues. This will cause the inductive current to drastically drop. The worst situation is that when the PWM effective edge arrives, the inductive current has not been lower than the current limiting protection threshold or completion of de-blocking logic has not been confirmed although the inductive current has been lower than the threshold, and this will cause all the four switch transistors to be turned off within a next PWM cycle. In this case, the inductive current even will fall from a peak value to near zero, resulting in that output voltage waveforms are very poor at the time of the wave-by-wave current limiting. For non-wave-by-wave current limiting, such a problem does not exist. However, if de-blocking logic is completed, when the inductive current again exceeds the current limiting threshold because the main switch transistor Q1 continues to be on, it is again necessary to enter current-limiting wave blockage logic. Such repeated steps will cause multiple times of wave blockage within a next PWM cycle.

Thus, the current limiting control method for a three-level inverter as shown in FIG. 3 of the present invention is proposed. At step S1 of the present embodiment, it is assumed that at a time t1 the inductive current I exceeds the set current-limiting current threshold, the overcurrent signal OCP is enabled, resulting in entering current limiting protection logic, the main transistors Q1 and Q4 are turned off such that the inductive current I no longer rises, and then the auxiliary switch transistors Q2 and Q3 are turned off, so as to complete transistor blockage logic.

At step S2, when the inductive current I drops to lower than the current limiting threshold, the overcurrent signal OCP is disabled, and at this time the auxiliary switch transistors Q2 and Q3 are directly turned on, without needing to wait for a PWM effective edge. The benefit of such doing is: after the auxiliary switch transistors Q2 and Q3 are turned on, the inductive current I freewheels via the auxiliary switch transistors Q2 and Q3 and a neutral-point clamping diode, without irrigating a unilateral bus; in addition, at this time, the bridge arm output voltage is at a N-point level, i.e., 0, which is higher than the level of the negative bus when all the four switch transistors Q1-Q4 are blocked, the inductive voltage drops slightly and falls slightly, and the output voltage waveforms are also much better.

At step S3, when the received overcurrent signal is disabled and a next PWM effective edge of the main switch transistor Q1 and Q4 arrives, the main switch transistors Q1 and Q4 are turned on. At this step, the main switch transistors Q1 and Q4 still need to wait for a PWM effective edge. because if the main switch transistors Q1 and Q4 are turned on at this time, the inductive current I will again be caused to rise to exceed the current limiting threshold, thereby triggering another current limiting logic and thus increasing switching loss of devices. Thus at this time, it is unnecessary to immediately turn on the main switch transistors Q1 and Q4, and it is more appropriate to wait for a next PWM effective edge.

By implementing the current limiting control method for the three-level inverter according to the present invention, when the current output from the bridge arm drops to lower than the current limiting threshold, the auxiliary switch transistors are directly turned on, making it possible to ensure voltage waveform quality, and when a next PWM effective edge of the main switch transistors arrives, the main switch transistors are turned on, making it possible to ensure that a switching frequency of the switch transistors will not excessively increase, so as to reduce switching loss.

Figure 4:
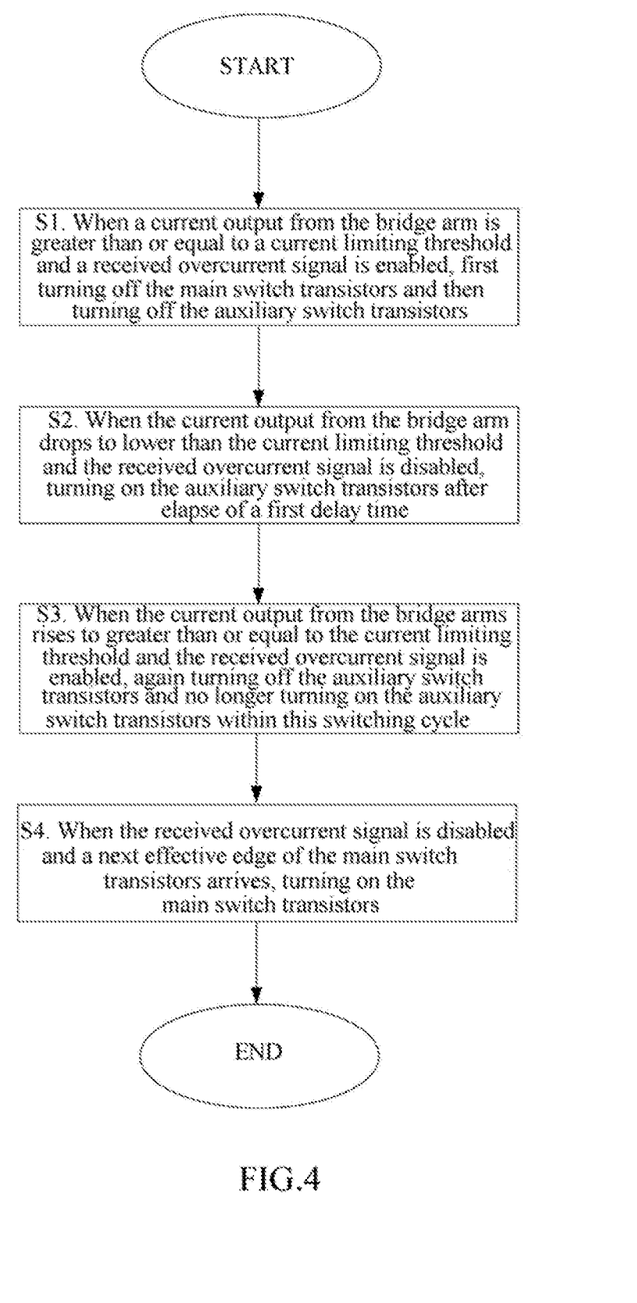
FIG. 4 is a flowchart of a second embodiment of the current limiting control method for a three-level inverter according to the present invention.

FIG. 4 is a flowchart of a second embodiment of the current limiting control method for a three-level inverter according to the present invention. The current limiting control method for a three-level inverter as shown in FIG. 4 is applicable to various types of three-level inverters, such as I-type three-level inverters and T-type three-level inverters. single-phase or multi-phase three-level inverters. The three-level inverter at least comprises a bridge arm including main switch transistors and auxiliary switch transistors. As shown in FIG. 4, the current limiting control method for a three-level inverter according to the present invention comprises the following steps. At step S1, when a current output from the bridge arm is greater than or equal to a current limiting threshold and a received overcurrent signal is enabled, first turning off the main switch transistors and then turning off the auxiliary switch transistors. At step S2, when the current output from the bridge arm drops to lower than the current limiting threshold and the received overcurrent signal is disabled, turning on the auxiliary switch transistors after elapse of a first delay time. At step S3, when the current output from the bridge arms rises to greater than or equal to the current limiting threshold and the received overcurrent signal is enabled, again turning off the auxiliary switch transistors and no longer turning on the auxiliary switch transistors within this switching cycle. At step S4, when the received overcurrent signal is disabled and a next PWM effective edge of the main switch transistors arrives, turning on the main switch transistors.

Hereinafter, the current limiting control method for a three-level inverter of the present embodiment will be described as follows also by taking the bridge arm output circuit of the I-type three-level inverter as shown in FIG. 1 as an example. At step S1 of the present embodiment, it is assumed that at a time t11 the inductive current I exceeds the set current-limiting current threshold, the overcurrent signal OCP is enabled, resulting in entering current limiting protection logic, the main transistors Q1 and Q4 are turned off such that the inductive current I no longer rises, and then the auxiliary switch transistors Q2 and Q3 are turned off, so as to complete transistor blockage logic.

In the embodiment as shown in FIG. 3, at step S2, when the inductive current I drops to lower than the current limiting threshold, the overcurrent signal OCP is disabled, and at this time the auxiliary switch transistors Q2 and Q3 are directly turned on, without needing to wait for a PWM effective edge. Such processing is under the assumption that when the auxiliary switch transistors Q2 and Q3 are turned on, the inductive current freewheels and will not rise. However, in the case of actual loading, it is also possible that when the output filter capacitive level is lower than the N-point level, i.e., 0 (for example when the bypass of a UPS is short-circuited or there are other active machines at the inverter output), or when the voltage and the current are of different polarities (for example II/IV quadrants of an inductive load and a capacitive load), in these operating conditions the inductive current will rise when the auxiliary switch transistors Q2 and Q3 are turned on. Then when the inductive current I again rises to higher than the current limiting threshold, the auxiliary switch transistors Q2 and Q3 are turned off. The above operating conditions are possibly repeated multiple times, causing switching of the auxiliary switch transistors Q2 and Q3 to be performed multiple times, resulting in that the loss abruptly increases.

With respect to such a deficiency, in the present embodiment, the following optimization steps are proposed. At step S2, when the inductive current I drops to lower than the current limiting threshold, the overcurrent signal OCP is disabled, and the auxiliary switch transistors Q2 and Q3 are turned on after elapse of a first delay time (for example 2 uS). In the first delay time, the diodes of the main switch transistors Q1 and Q4 freewheels. The first delay time is adjustable, and adjusting the first time delay can adjust the heat generation distribution between the diodes of the main switch transistors Q1 and Q4 and the diodes of the auxiliary switch transistors Q2 and Q3. At step S3, since the auxiliary switch transistors Q2 and Q3 have been turned on, the inductive current I possibly again rises to equal to or greater than the current limiting threshold, resulting in that the overcurrent signal OCP is again disabled; at this time the auxiliary switch transistors Q2 and Q3 are turned off, then within this switching cycle, no matter whether the inductive current I drops to lower than the current limiting threshold, the auxiliary switch transistors Q2 and Q3 are no longer turned on. In this way, within one switching cycle, switching of the auxiliary switch transistors Q2 and Q3 is possibly performed once or twice. In the worst situation, the auxiliary switch transistors Q2 and Q3 are equivalent to being two-times multiplied. With respect to a normal operating condition, the switching loss is increased by one time. Thus, it is made possible to more efficiently control the switching frequency of the auxiliary switch transistors, so as to further reduce switching loss.

At step S3, when the received overcurrent signal is disabled and a next PWM effective edge of the main switch transistor Q1 and Q4 arrives, the main switch transistors Q1 and Q4 are turned on. At this step, the main switch transistors Q1 and Q4 still need to wait for a PWM effective edge, because if the main switch transistors Q1 and Q4 are turned on at this time, the inductive current I will again be caused to rise to exceed the current limiting threshold, thereby triggering another current limiting logic and thus increasing switching loss of devices. Thus at this time, it is unnecessary to immediately turn on the main switch transistors Q1 and Q4, and it is more appropriate to wait for a next PWM effective edge.

By implementing the current limiting control method for a three-level inverter according to the present invention, when the current output from the bridge arm drops to lower than the current limiting threshold, the auxiliary switch transistors are directly turned on, making it possible to ensure voltage waveform quality, and when a next PWM effective edge of the main switch transistors arrives, the main switch transistors are turned on, making it possible to ensure that a switching frequency of the switch transistors will not excessively increase, so as to reduce switching loss. Further, by limiting a switching frequency of the auxiliary switch transistors within each switching cycle, it is made possible to more efficiently control the switching frequency of the auxiliary switch transistors, so as to further reduce switching loss.

Figure 5:
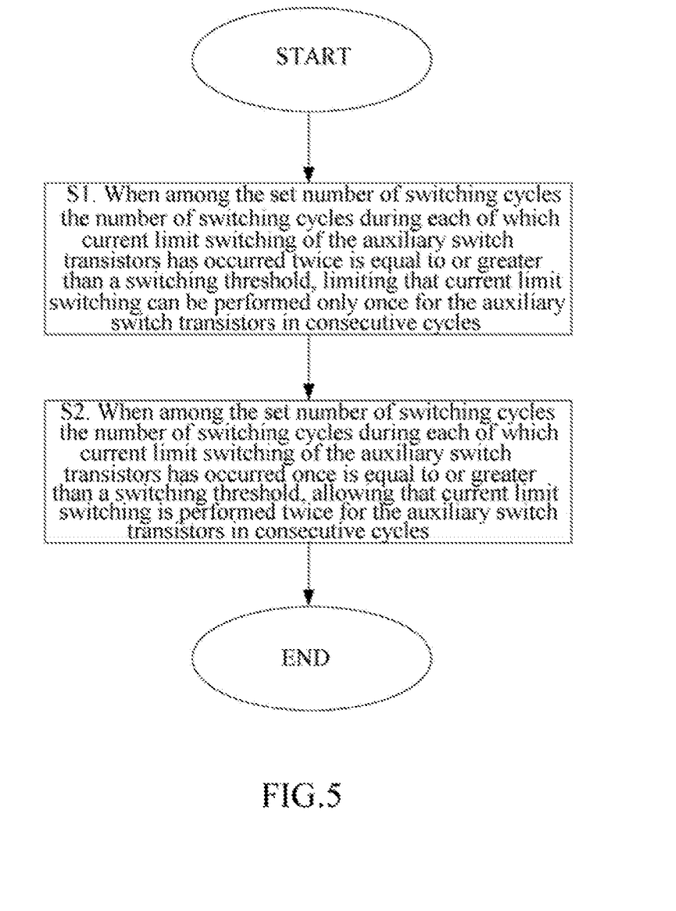
FIG. 5 is a flowchart of a switching-frequency switching steps of auxiliary switch transistors of a third embodiment of the current limiting control method for a three-level inverter according to the present invention.

FIG. 5 is a flowchart of a switching-frequency switching steps of auxiliary switch transistors of a third embodiment of the current limiting control method for a three-level inverter according to the present invention. The embodiment as shown in FIG. 4 may be further optimized to switch, based on the number of switching cycles during each of which current limit switching of the auxiliary switch transistors Q2 and Q3 has occurred twice, a switching frequency of the auxiliary switch transistors Q2 and Q3 within each switching cycle, so as to limit the switching frequency of the auxiliary switch transistors Q2 and Q3.

As shown in FIG. 5, at step S1, when among the set number of switching cycles the number of switching cycles during each of which current limit switching of the auxiliary switch transistors has occurred twice is equal to or greater than a switching threshold, it is limited that current limit switching can be performed only once for the auxiliary switch transistors in consecutive cycles. At step S2, when among the set number of switching cycles the number of switching cycles during each of which current limit switching of the auxiliary switch transistors has occurred once is equal to or greater than a switching threshold, it is allowed that current limit switching is performed twice for the auxiliary switch transistors in consecutive cycles.

For example, the number of switching cycles during each of which current limit switching of the auxiliary switch transistors Q2 and Q3 is performed twice may be counted within a plurality of PWM switching cycles. When it is found that the number is greater than the switching threshold, it is limited that current limit switching can be performed only once for the auxiliary switch transistors Q2 and Q3 in consecutive cycles. For example, if within the plurality of cycles it is found that the case where current limit switching of the auxiliary switch transistors Q2 and Q3 is performed twice within one cycle has occurred during each of N1 (for example N1=2) switching cycles, it may be limited that within subsequent consecutive N2 (for example N2=40) cycles, current limit switching can be performed only once for the auxiliary switch transistors Q2 and Q3 within each switching cycle. Then, the number of switching cycles during each of which current limit switching of the auxiliary switch transistors Q2 and Q3 is performed once may be counted within the plurality of PWM switching cycles. When it is found that the number is greater than the switching threshold, it is limited that current limit switching can be performed twice for the auxiliary switch transistors Q2 and Q3 in consecutive cycles. Through such limitations, when current limiting is performed, the switching frequency of the auxiliary switch transistors Q2 and Q3 is at most increased to (1+N1/N2) times. For example: when N1=2 and N2=40, the frequency is increased by five percent.

In current limiting protection such as short circuit, sudden rectifier load and the like in most of operating conditions, the process of current limiting de-blocking is as follows: when the inductive current I drops to below the current limiting threshold, the auxiliary switch transistors Q2 and A3 may be turned on according to logic, without needing to wait for arrival of a PWM effective edge of a next switching cycle. After the auxiliary switch transistors Q2 and A3 are turned on, the bridge arm side voltage is at 0 level, and since the load side voltage is 0 (the case of short circuit) or is positive (the case of rectifier load), the inductive current I will maintain unchanged or decreased, making it impossible to again enter current limiting. With respect to wave-by-wave current limiting, the auxiliary switch transistors Q2 and A3 are turned on in advance, thus ensuring voltage waveforms, and the number of times of switching does not change.

During current limiting protection in extreme cases, such as common conduction of a main circuit and a bypass, the process of current limiting de-blocking is as follows: after the inductive current I drops to below the current limiting threshold, the auxiliary switch transistors Q2 and A3 are turned on according to logic; after the auxiliary switch transistors Q2 and A3 are turned on, the bridge arm side voltage is at 0 level, the load side is a bypass voltage source, the inductive current I possibly continues to increase, again triggering a current limiting point, the auxiliary switch transistors Q2 and A3 are turned off for a second time and no longer turned on, until an effective edge of a second switching cycle arrives. In the second switching cycle, the above operations are repeated. In the third switching period, the current limiting mode is switched to wave-by-wave current limiting (current limit switching can be performed only once within the switching period). After consecutive 40 cycles of wave-by-wave current limiting, the current limiting mode is switched back to allow current limiting to be performed twice. The number of times of switching is increased by 5%, and the increase proportion of switching loss is small.

By implementing the current limiting control method for a three-level inverter according to the present invention, when the current output from the bridge arm drops to lower than the current limiting threshold, the auxiliary switch transistors are directly turned on, making it possible to ensure voltage waveform quality, and when a next PWM effective edge of the main switch transistors arrives, the main switch transistors are turned on, making it possible to ensure that a switching frequency of the switch transistors will not excessively increase, so as to reduce switching loss. Further, by limiting a switching frequency of the auxiliary switch transistors within each switching cycle and controlling the number of times of two-time current limit switching of the auxiliary switch transistors within a plurality of cycles, it is made possible to more efficiently control the switching frequency of the auxiliary switch transistors, so as to further reduce switching loss.

Figure 8:
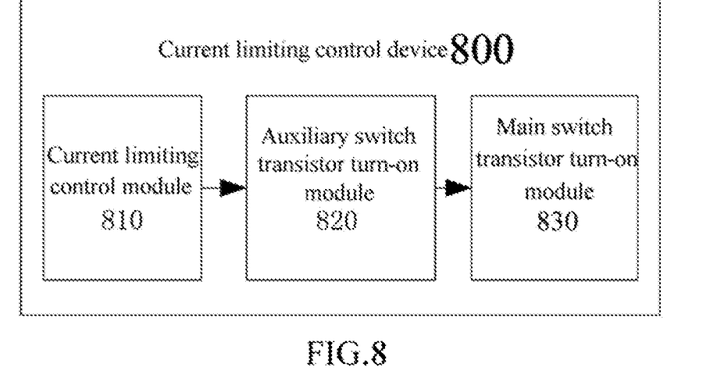
FIG. 8 is a principle block diagram of a first embodiment of a current limiting control device for a three-level inverter according to the present invention.

FIG. 8 is a principle block diagram of a first embodiment of a current limiting control device for a three-level inverter according to the present invention. The current limiting control device for a three-level inverter as shown in FIG. 8 is applicable to various types of three-level inverters, such as I-type three-level inverters and T-type three-level inverters, a single-phase or multi-phase three-level inverters. The three-level inverter at least comprises a bridge arm including main switch transistors and auxiliary switch transistors.

As shown in FIG. 8, the current limiting control device 800 comprises: a current limiting control module 810, an auxiliary switch transistor turn-on module 820 and a main switch transistor turn-on module 830. As shown in FIG. 8, the current limiting control module 810 is used for, when a current output from the bridge arm is greater than or equal to a current limit threshold and a received overcurrent signal is enabled, first turning off the main switch transistors and then turning off the auxiliary switch transistors. The auxiliary switch transistor turn-on module 820 is used for, when the current output from the bridge arm drops to lower than the current limit threshold and the received overcurrent signal is disabled, turning on the auxiliary switch transistors. The main switch transistor turn-on module 830 is used for, when the received overcurrent signal is disabled and a next PWM effective edge of the main switch transistors arrives, turning on the main switch transistors.

As appreciated by those skilled in the art, the current limiting control module 810, the auxiliary switch transistor turn-on module 820 and the main switch transistor turn-on module 830 according to the present invention may be constructed based on the current limiting control method for the three-level inverter as shown in FIG. 3. which will not be repeatedly described herein.

By implementing the current limiting control device for a three-level inverter according to the present invention, when the current output from the bridge arm drops to lower than the current limiting threshold, the auxiliary switch transistors are directly turned on, making it possible to ensure voltage waveform quality, and when a next PWM effective edge of the main switch transistors arrives, the main switch transistors are turned on, making it possible to ensure that a switching frequency of the switch transistors will not excessively increase, so as to reduce switching loss.

Figure 9:
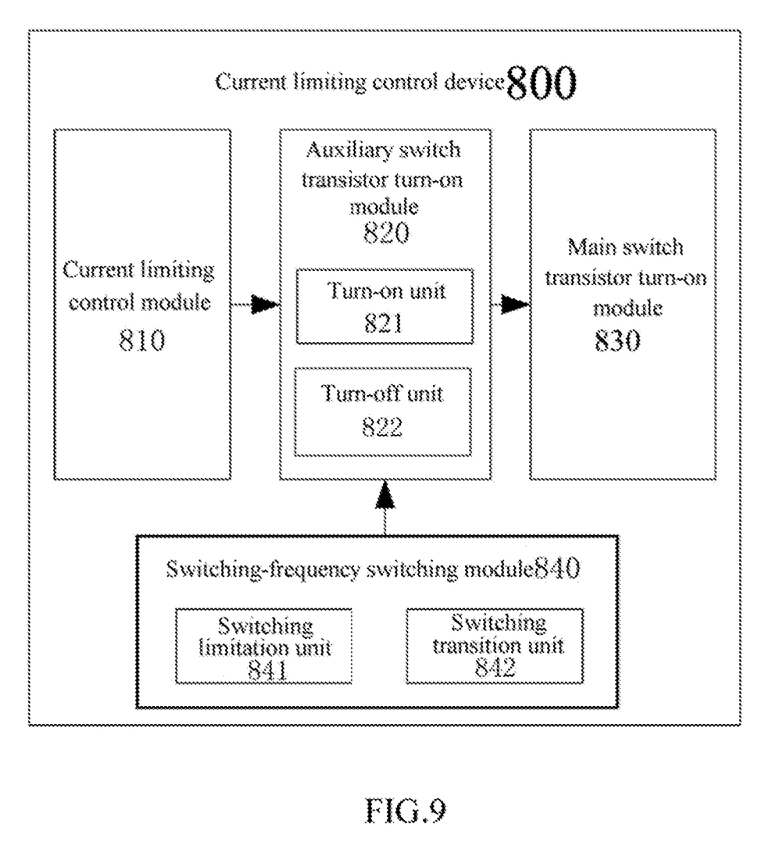
FIG. 9 is a principle block diagram of a second embodiment of the current limiting control device for a three-level inverter according to the present invention.

FIG. 9 is a principle block diagram of a second embodiment of the current limiting control device for a three-level inverter according to the present invention. The current limiting control device for a three-level inverter as shown in FIG. 9 is applicable to various types of three-level inverters, such as i-type three-level inverters and T-type three-level inverters, a single-phase or multi-phase three-level inverters. The three-level inverter at least comprises a bridge arm including main switch transistors and auxiliary switch transistors.

As shown in FIG. 9, the current limiting control device 800 comprises: a current limiting control module 810, an auxiliary switch transistor turn-on module 820, a main switch transistor turn-on module 830 and a switching-frequency switching module 840. As shown in FIG. 9, the current limiting control module 810 is used for, when a current output from the bridge arm is greater than or equal to a current limit threshold and a received overcurrent signal is enabled, first turning off the main switch transistors and then turning off the auxiliary switch transistors. The auxiliary switch transistor turn-on module 820 is used for, when the current output from the bridge arm drops to lower than the current limit threshold and the received overcurrent signal is disabled, turning on the auxiliary switch transistors. The main switch transistor turn-on module 830 is used for, when the received overcurrent signal is disabled and a next PWM effective edge of the main switch transistors arrives, turning on the main switch transistors. The switching-frequency switching module 840 is used for switching, based on the number of switching cycles during each of which current limit switching of the auxiliary switch transistors has occurred twice, a switching frequency of the auxiliary switch transistors within each switching cycle.

Further as shown in FIG. 9, the auxiliary switch transistor turn-on module 820 further comprises: a turn-on unit 821 and a turn-off unit 822. The turn-on unit 821 is used for, when the current output from the bridge arm drops to lower than the current limit threshold and the received overcurrent signal is disabled, turning on the auxiliary switch transistors after elapse of a first delay time. The turn-off unit 822 is used for, when the current output from the bridge arms rises to greater than or equal to the current limit threshold and the received overcurrent signal is enabled, again turning off the auxiliary switch transistors and no longer turning on the auxiliary switch transistors within this switching cycle.

The switching-frequency switching module 840 further comprises: a switching limitation unit 841 and a switching transition unit 842. The switching limitation unit 841 is used for, when among the set number of switching cycles the number of switching cycles during each of which current limit switching of the auxiliary switch transistors has occurred twice is equal to or greater than a switching threshold, limiting the auxiliary switch transistors to be capable of performing current limit switching only once in consecutive cycles. The switching transition unit 842 is used for, when among the set number of switching cycles the number of switching cycles during each of which current limit switching of the auxiliary switch transistors has occurred once is equal to or greater than a switching threshold, allowing that current limit switching is performed twice for the auxiliary switch transistors in consecutive cycles.

As appreciated by those skilled in the art, the current limiting control module 810, the auxiliary switch transistor turn-on module 820, the main switch transistor turn-on module 830 and the switching-frequency switching module 840, the turn-on unit 821 and the turn-off unit 822, as well as the switching limitation unit 841 and the switching transition unit 842 according to the present invention may be constructed based on the current limiting control methods of the three-level inverter as shown in FIGS. 4-5, which will not be repeatedly described herein.

By implementing the current limiting control method for a three-level inverter according to the present invention, when the current output from the bridge arm drops to lower than the current limiting threshold, the auxiliary switch transistors are directly turned on, making it possible to ensure voltage waveform quality, and when a next PWM effective edge of the main switch transistors arrives, the main switch transistors are turned on, making it possible to ensure that a switching frequency of the switch transistors will not excessively increase, so as to reduce switching loss. Further, by limiting a switching frequency of the auxiliary switch transistors within each switching cycle and controlling the number of times of two-times current limit switching of the auxiliary switch transistors within a plurality of cycles, it is made possible to more efficiently control the switching frequency of the auxiliary switch transistors, so as to further reduce switching loss.

The foregoing are only optimal embodiments of the present invention, but are not used to limit the present invention. Any modification, equivalent substitution and improvement and the like made within the spirit and principle of the present invention should be contained in the scope of protection of the present invention. Moreover, although the present disclosure has been shown and described with respect to one or more implementations, those skilled in the art would conceive of equivalent variants and modifications based on the reading and understanding to the Description and the Drawings. The present disclosure includes all such modifications and variants, and is limited only by the scope of the appended claims. Particularly with regard to the various functions implemented by the above devices, modules or units, terms for describing such devices, modules or units aim to correspond to any device, module or unit that implements the specified functions of the devices, modules or units (for example they are equivalent in terms of functions) (unless otherwise indicated), even if they are not equivalent to the disclosed structures that implement the functions in the exemplary implementations of the present disclosure as shown herein. In addition, although the specified features of the present disclosure have been disclosed with respect to only one of several implementations, such features may be combined with for example one or more other features of other implementations which could be desired and advantageous for given or specific applications.

The various devices, modules or units in the embodiments of the present invention may be integrated in one device, module or unit, and may also be separate physical existence individuals, and it is also possible that two or more devices, modules or units are integrated in one device, module or unit. The foregoing integrated devices, modules or units may be realized either in the form of hardware or in the form of software functional modules. If the integrated devices, modules or units are realized in the form of software functional modules and are sold or used as independent products, they may also be stored in a computer readable storage medium. The aforementioned storage medium may be an RAM, a magnetic disk or an optical disk or the like. The foregoing devices, apparatuses or systems may implement the methods in the corresponding method embodiments.

The foregoing are only optimal embodiments of the present invention, but are not used to limit the present invention. Any modification, equivalent substitution and improvement and the like made within the spirit and principle of the present invention should be contained in the scope of protection of the present invention.

What is claimed is:

1. A current limiting control method for a three-level inverter, wherein the three-level inverter at least comprises a bridge arm including main switch transistors and auxiliary switch transistors, characterized in that the method comprises the following steps:
   S1. when a current output from the bridge arm is greater than or equal to a current limiting threshold and a received overcurrent signal is enabled, first turning off the main switch transistors and then turning off the auxiliary switch transistors;
   S2. when the current output from the bridge arm drops to lower than the current limiting threshold and the received overcurrent signal is disabled, turning on the auxiliary switch transistors;
   S3. when the received overcurrent signal is disabled and a next PWM effective edge of the main switch transistors arrives, turning on the main switch transistors; and
   S4. switching, based on a number of switching cycles during each of which current limit switching of the auxiliary switch transistors has occurred twice, a switching frequency of the auxiliary switch transistors within each switching cycle,
   wherein the step S4 further comprises:
      S41. when among the set number of switching cycles the number of switching cycles during each of which current limit switching of the auxiliary switch transistors has occurred twice is equal to or greater than a switching threshold, limiting that current limit switching can be performed only once for the auxiliary switch transistors in consecutive cycles; and
      S42. when among the set number of switching cycles the number of switching cycles during each of which current limit switching of the auxiliary switch transistors has occurred once is equal to or greater than the switching threshold, limiting that current limit switching is performed twice for the auxiliary switch transistors in consecutive cycles.

2. The current limiting control method for a three-level inverter according to claim 1, characterized in that the three-level inverter comprises an I-type three-level inverter and a T-type three-level inverter.

3. The current limiting control method for a three-level inverter according to claim 1, characterized in that the step S2 further comprises:
   S21. when the current output from the bridge arm drops to lower than the current limiting threshold and the received overcurrent signal is disabled, turning on the auxiliary switch transistors after elapse of a first delay time; and
   S22. when the current output from the bridge arms rises to greater than or equal to the current limiting threshold and the received overcurrent signal is enabled, again turning off the auxiliary switch transistors and no longer turning on the auxiliary switch transistors within this switching cycle.

4. The current limiting control device for a three-level inverter, wherein the current limiting control device at least comprises a bridge arm including main switch transistors and auxiliary switch transistors, characterized in that the current limiting control device comprises:
- a current limiting control module for, when a current output from the bridge arm is greater than or equal to a current limiting threshold and a received overcurrent signal is enabled, first turning off the main switch transistors and then turning off the auxiliary switch transistors;
- an auxiliary switch transistor turn-on module for, when the current output from the bridge arm drops to lower than the current limiting threshold and the received overcurrent signal is disabled, turning on the auxiliary switch transistors;
- a main switch transistor turn-on module for, when the received overcurrent signal is disabled and a next PWM effective edge of the main switch transistors arrives, turning on the main switch transistors; and
- a switching-frequency switching module for switching, based on a number of switching cycles during each of which current limit switching of the auxiliary switch transistors has occurred twice, a switching frequency of the auxiliary switch transistors within each switching cycle,
- wherein the switching-frequency switching module further comprises:
  - a switching limitation unit for, when among the set number of switching cycles the number of switching cycles during each of which current limit switching of the auxiliary switch transistors has occurred twice is equal to or greater than a switching threshold, limiting the current limit switching to only being performed once for the auxiliary switch transistors in consecutive cycles; and
  - a switching transition unit for, when among the set number of switching cycles the number of switching cycles during each of which current limit switching of the auxiliary switch transistors has occurred once is equal to or greater than a switching threshold, allowing the current limit switching to be performed twice for the auxiliary switch transistors in consecutive cycles.

5. The current limiting control device for a three-level inverter according to claim 4, characterized in that the three-level inverter comprises an I-type three-level inverter and a T-type three-level inverter.

6. The current limiting control device for a three-level inverter according to claim 4, characterized in that the auxiliary switch transistor turn-on module further comprises:
- a turn-on unit for, when the current output from the bridge arm drops to lower than the current limiting threshold and the received overcurrent signal is disabled, turning on the auxiliary switch transistors after elapse of a first delay time;
- a turn-off unit for, when the current output from the bridge arms rises to greater than or equal to the current limiting threshold and the received overcurrent signal is enabled, again turning off the auxiliary switch transistors and no longer turning on the auxiliary switch transistors within this switching cycle.

* * * * *